United States Patent [19]

Husted

[11] Patent Number: 4,573,660
[45] Date of Patent: Mar. 4, 1986

[54] DOUBLE DISC GATE VALVE

[75] Inventor: Rodney O. Husted, Montoursville, Pa.

[73] Assignee: Anchor/Darling Valve Company, Williamsport, Pa.

[21] Appl. No.: 674,423

[22] Filed: Nov. 23, 1984

[51] Int. Cl.[4] .................... F16K 3/14; F16K 3/24
[52] U.S. Cl. .................... 251/195; 251/203; 251/327
[58] Field of Search ............ 251/327, 326, 328, 329, 251/193, 195, 197, 198, 199, 200, 202, 203, 204

[56] References Cited

U.S. PATENT DOCUMENTS

| | | | |
|---|---|---|---|
| 119,057 | 9/1871 | Snyder | 251/195 |
| 1,498,018 | 6/1924 | Cronkhite et al. | 251/202 |
| 2,689,106 | 9/1954 | Watkins | 251/200 |
| 4,007,906 | 2/1977 | Karpenko | 251/203 |
| 4,081,175 | 3/1978 | Hasbrouck | 251/327 |

FOREIGN PATENT DOCUMENTS 462444 7/1928 Fed. Rep. of Germany ...... 251/327

*Primary Examiner*—Martin P. Schwadron
*Assistant Examiner*—John Starsiak

[57] ABSTRACT

A double disc gate valve of the type wherein discs are provided with wedge means which force the discs against substantially parallel opposed valve seats having at least one spherical surface between a wedge and a valve disc to allow the discs to have more freedom of movement to accommodate misalignment of the seats due to variation in manufacturing tolerances or pipe line distortion.

5 Claims, 4 Drawing Figures

DOUBLE DISC GATE VALVE

SUMMARY OF THE INVENTION

The present invention relates to gate valves of the type wherein discs are forced by wedge elements against opposed, substantially parallel valve seats. Such valves have a number of substantial advantages over the less expensive, more common type of wedge type gate valves wherein a wedge, which may be formed of two valve discs, is forced between valve seats having a V-shaped opening between the two valve seats. In this type of valve the valve discs themselves form a V and are forced against the seats in contrast with valves of the present invention wherein wedges are employed one of which is connected to the valve stem and the other of which bottoms out against the valve body to force the wedges apart, thus forcing the discs against substantially parallel valve seats.

The advantage of the present type of valves is that the seats are not subjected to the full impact of the closing thrust as is the case of the wedge type valve. Also, the valves of the present invention are not susceptible to damage due to thermal binding. With wedge gate valves it is common for problems to be encountered when a valve is closed hot and allowed to cool before being reopened. The disc is pinched tightly due to the proportionally larger thermal contraction of the body and may be distorted or even destroyed due to the large force which is necessary to open the valve. In contrast, in valves of the present invention, the wedges collapse due to the movement of the stem, and allow the discs to move inwardly and then raise without damage to the valve discs or the valve seats.

In wedge type valves the inertial force of closing the valves is absorbed directly by the seating surface. In the valve of the present invention, the largest force is transmitted directly to the bottom of the valve body on a non-sealing surface so that there is no injury or pressure on either the discs or the valve seats.

Normally the valve seats are parallel to each other but sometimes there are slight deviations from exact parallelism which may be caused by the tolerances employed in manufacturing the valves or by some mechanical stress on the valve body brought about by some means such as thermal or mechanical pressure on the body or the pipes attached to the body.

In accordance with the present invention, a valve of the double disc type is provided with spherical surfaces between at least one of the dics and the wedge assembly. Preferably both of the discs are provided with complementary spherical connections between the wedge and the discs to compensate for slight misalignments by allowing the valve discs to have more freedom of movement.

Other objects and features of the invention will be brought out in the balance of the specification.

DESCRIPTION OF THE PREFERRED EMBODIMENT

Figure 1:
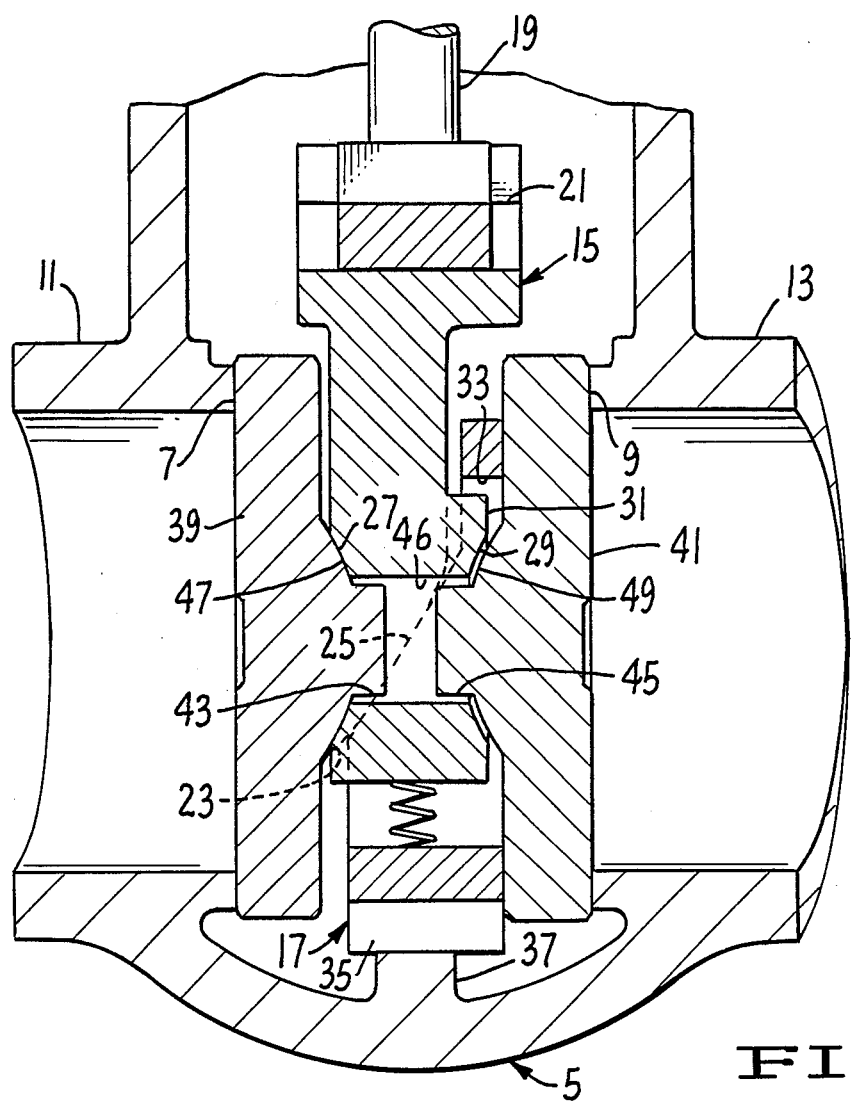
FIG. 1 is a partial sectional view of a double disc valve embodying the present invention.
Figure 2:
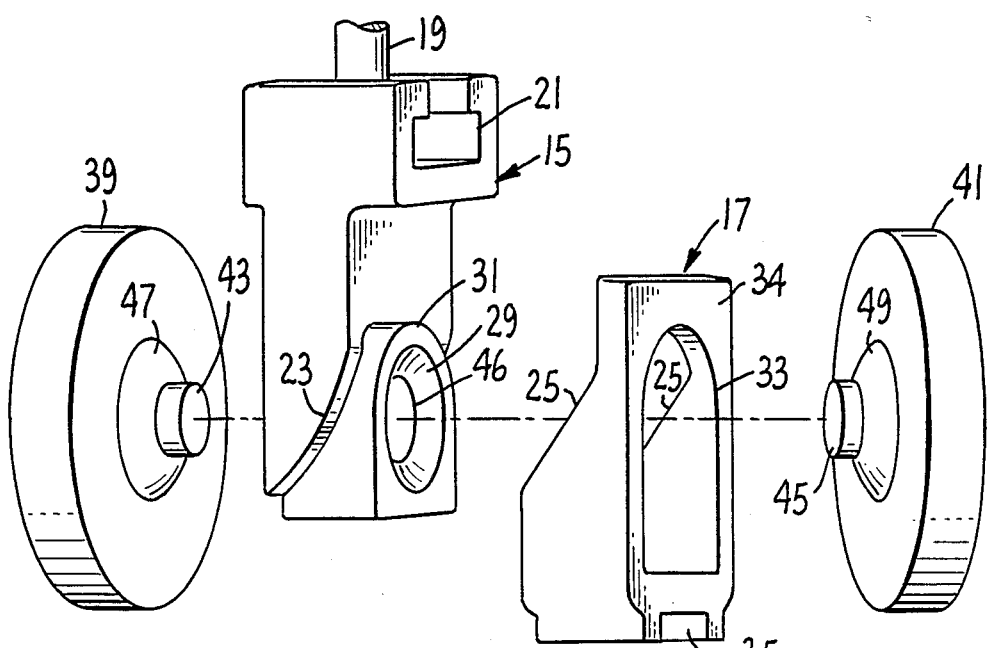
FIG. 2 is an exploded perspective view of the discs and wedge assembly.

Referring to the drawings by reference characters, there is shown a valve having a valve body 5 and opposed, parallel seats 7 and 9 which are connected to inlet and outlet ports 11 and 13. The valve includes an upper wedge generally designated 15 and a lower wedge generally designated 17. The upper wedge is moved by means of a stem 19 which terminates in a T-head, not shown, which moves within a slot 21 in the upper wedge so that the upper wedge has freedom of movement in the direction parallel to the flow.

Wedge 15 has arcuate surfaces 23 on each edge thereof which mate with an angling surface 25 on the lower wedge. The upper wedge has two concave spherical surfaces, one on each side thereof, namely, 27 and 29. Projection 31 on the upper wedge extends through a slot 33 on the flat surface 34 of the lower wedge. The lower wedge has a slot 35 at the bottom thereof which fits over ridge 37 formed in the bottom of the valve body. When the two wedges are assembled, that is the projection 31 extends through slot 33 and slot 35 is placed over the ridge 37, it is obvious that the wedge assembly has some freedom of motion but cannot turn.

The valve is provided with two discs 39 and 41 each of which has a central boss 43 and 45 which extends into a recess 46 in the upper wedge element 15. Surrounding each boss is a convex spherical surface, namely, a surface 47 which is complementary to the concave surface 27 and a surface 49 which is complementary to surface 29.

FIG. 1 shows the parts as the valve is closed. It will be seen that the disc 39 is urged into contact with seat 7 primarily by pressure exerted between the mating spherical surfaces 27 and 47. The disc 41 is urged against seat 9 primarily by pressure from the flat surface 34 on the lower wedge 17.

Figure 3:
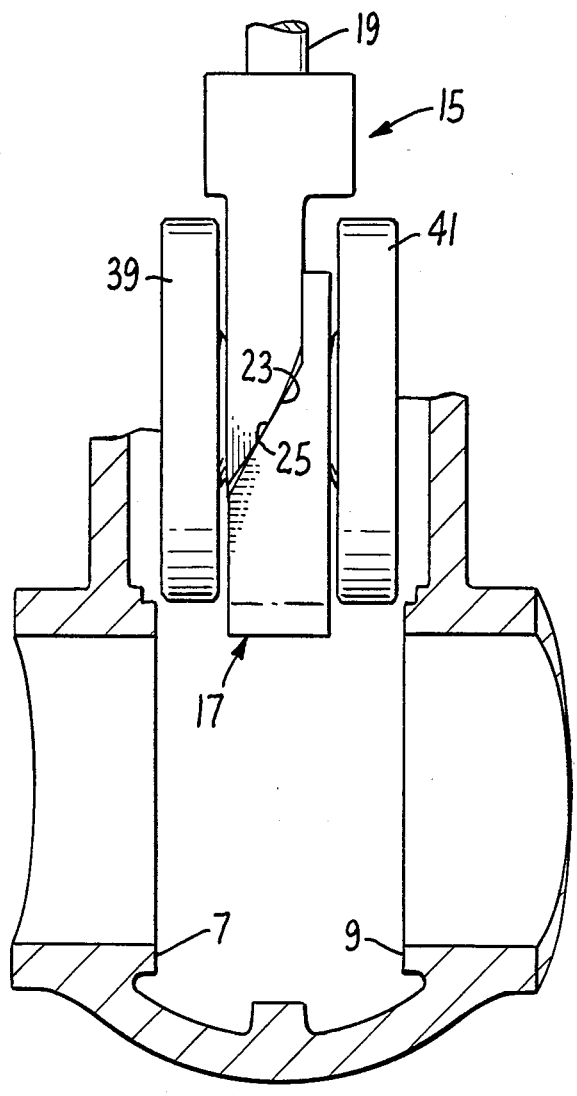
FIG. 3 is a view, partly in section, showing the valve in the open position.

In FIG. 3 the parts are shown in the position when the valve is opened. Here the two wedge elements have moved along each other to a substantially collapsed position, allowing the discs to move in and to clear the seats 7 and 9, opening the valve to a full flow position.

Figure 4:
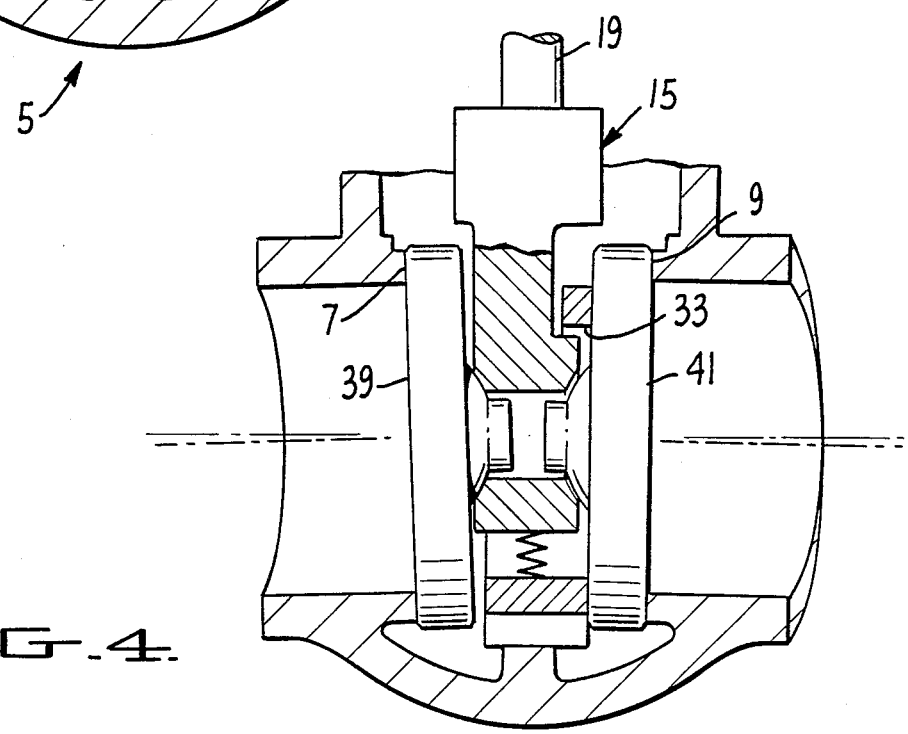
FIG. 4 is a view, partly in section, of a valve made in accordance with the present invention showing the position of the parts when the seats are not exactly parallel.

In FIG. 4, there is shown, in much exaggerated form, the position of the parts when the seats are out of alignment. Referring to disc 39, it can be seen that it has rotated on its spherical surface 47 so that it is in sealing relationship with the seat 7 and, thus, it is no longer precisely lined up with the wedge assembly. This has also permitted the lower wedge to shift slightly so that the disc 41 is in sealing relationship with seat 9. The mating spherical surfaces 29 and 41 are not necessary for the operation of the valve but are desireable to permit interchangeability of the two discs.

Many variations can be made in the exact structure shown without departing from the spirit of this invention. For instance, the discs are illustrated having convex seats while the upper wedge element has a pair of concave complementary seats. Obviously, this relationship could be reversed. Also, it will be noted, particularly with reference to FIG. 4 that in serious cases of misalignment, the disc 41 is held against valve seat by means of the flat surface 34 and that the ball and socket joint is no longer in contact. Thus, the benefits of the present invention can largely be obtained utilizing a single mating spherical connection between one disc and the upper wedge element.

What is claimed is:

1. In a double disc valve comprising a valve body having a pair of substantially parallel seats, a pair of valve discs operatively associated with said seats, respectively, and means for wedging said discs apart and forcing said discs against said seats; the improvement comprising:
- a pair of discs, each disc having a valve seat on one side, a central boss on the other side, a spherical surface portion encircling said boss and a relatively flat surface portion around said spherical surface portion;
- an upper wedge having a lateral projection formed with a central passage therethrough, a pair of spaced inclined wedge surfaces formed on opposite sides of said central passage, and a spherical surface formed around at least one end of said central passage, the boss of each disc being received in opposite ends of said central passage;
- a lower wedge having an elongate slot that receives the projection formed on said upper wedge, a pair of spaced inclined wedge surfaces formed on opposite sides of said slot and engageable with the inclined wedge surfaces of said upper wedge, and a relatively flat surface engageable with the flat surface portions of one disc;
- whereby said pair of discs may be interchanged and actuated by either said upper wedge or lower wedge, spherical surface engagement between said upper wedge and disc allowing adjustment for slight non-parallel alignments of valve seats and valve body distortions while providing a uniform distribution of sealing pressure.

2. The valve of claim 1, the inclined wedge surfaces formed on said upper wedge being arcuate, the inclined surfaces formed on said lower wedge being substantially straight.

3. The valve of claim 1, said upper wedge being formed with a T-shaped slot that extends parallel with the direction of lateral disc movement during seating, and means engageable with said T-shaped slot for moving said upper wedge transversely relative to the direction of disc movement during seating.

4. The valve of claim 1, the spherical surface portions of each disc being convex and the spherical surface portions of said upper wedge being concave.

5. The valve of claim 2, said inclined wedge surfaces of said upper and lower wedges making surface contacts for seating said discs at points substantially within a plane containing the central axis of each valve seat.

* * * * *